United States Patent
Knobel et al.

(10) Patent No.: US 6,765,871 B1
(45) Date of Patent: Jul. 20, 2004

(54) FIBER CHANNEL FLOW CONTROL METHOD AND APPARATUS FOR INTERFACE TO METRO AREA TRANSPORT LINK

(75) Inventors: Stephen Knobel, Kemptville (CA); Allan Dennis Dufour, Hull (CA); Barry Leo Pelley, Kinburn (CA); Jim Chi-Luen Yau, Kanata (CA); Germain Paul Bisson, Stittsville (CA); Randy A. Jones, Nepean (CA); Steve Kieran Anthony Adolph, Ottawa (CA)

(73) Assignee: Akara Corporation, Ontario (CA)

( * ) Notice: Subject to any disclaimer, the term of this patent is extended or adjusted under 35 U.S.C. 154(b) by 726 days.

(21) Appl. No.: 09/724,036

(22) Filed: Nov. 29, 2000

(51) Int. Cl.$^7$ .................................................. H04J 3/22

(52) U.S. Cl. ........................ 370/231; 370/236; 370/463; 709/228; 709/233

(58) Field of Search ................................. 370/229, 230, 370/230.1, 231, 235, 236, 236.2, 498, 535, 540, 463; 709/227, 228, 230, 232, 233, 235, 236

(56) References Cited

U.S. PATENT DOCUMENTS

| | | | | |
|---|---|---|---|---|
| 5,313,454 A | * | 5/1994 | Bustini et al. | 370/231 |
| 5,392,280 A | * | 2/1995 | Zheng | 370/353 |
| 5,867,480 A | * | 2/1999 | Thomas et al. | 370/230 |
| 6,222,823 B1 | * | 4/2001 | Smith et al. | 370/230 |
| 6,515,963 B1 | * | 2/2003 | Bechtolsheim et al. | 370/229 |
| 6,614,796 B1 | * | 9/2003 | Black et al. | 370/403 |

FOREIGN PATENT DOCUMENTS

| JP | 08167898 | 12/1994 |
|---|---|---|
| WO | WO 97/35409 | 9/1997 |

OTHER PUBLICATIONS

EPO Search Report dated Oct. 22, 2002 (EP 01 12 7934).
Cummings, R., "Fibre Channel—A "CHAN" for all reasons, channel network," *IEEE*, Sep. 1994, XP010140037, 660–665.
Kung, H.T., et al., "Client–server performance on flow–controlled ATM networks: a web database of simulation results," *IEEE*, Apr. 1997, XP010251953, 1218–1226.
Ozveren, C.M., et al., "Reliable and efficient hop–by–hop flow control," *IEEE Journal,* May 1995, 4, 642–650.

\* cited by examiner

*Primary Examiner*—Hassan Kizou
*Assistant Examiner*—D Levitan
(74) *Attorney, Agent, or Firm*—Michael R. Cammarata; Allan Millard; Lynn S. Cassan

(57) ABSTRACT

This invention relates to a method and apparatus for controlling the flow of fiber channel (FC) data frames from a fiber channel link to a metropolitan area link of lesser bandwidth (a synchronous optical network (SONET)). The release of each data unit by a data source for transport onto the first channel is governed by a credit-based protocol whereby one data unit is released upon the provision of one credit unit. A first marker identifies a high limit H of the buffer at which a first condition occurs, H being less than N and the first condition applying when the number of data units in the buffer is greater than H. A second marker identifies a low limit L of the buffer at which a second condition occurs, L being less than H and the second condition applying when the number of data units in the buffer is less than L. A credit unit owed counter O counts the number of credit units which become owed to the data source when the second condition applies. A third marker Max identifies a maximum number of credit units that may be provided to the data source when the first condition applies and the value of the credit unit counter is greater than zero. Through this invention, effective means to control the flow of data from a fiber channel link to a metro area transport link without loss of frames or delay is provided.

16 Claims, 5 Drawing Sheets

FIBER CHANNEL FLOW CONTROL METHOD AND APPARATUS FOR INTERFACE TO METRO AREA TRANSPORT LINK

FIELD OF INVENTION

This invention relates to a method and apparatus for controlling the flow of fiber channel (FC) data frames from a fiber channel link to a metropolitan area link of lesser bandwidth (a synchronous optical network (SONET)).

BACKGROUND OF THE INVENTION

A standard protocol for the exchange and flow of data (frames) over a fiber channel (FC) link is provided by the FiberChannel Physical and Signalling Interface (FC-PH) (see *Information Technology—Fibre Channel—Physical and Signalling Interface (FC-PH)*, ANSI X3.230-1994) directed to a fixed rate point-to-point serial data link. However, this protocol uses a one-to-one credit based flow control mechanism (i.e. the R_RDY primitive which is generated upon the release of a frame from an interface buffer and is required to be received by the client device before it can transmit a further frame) which assumes a nominal data rate over the entire area of control. However, its use across a metropolitan area link having a data rate which is less than the nominal FC-PH data rate results in delay and frame loss and such frame loss and delay resulting from the bandwidth disparity is unsatisfactory for many applications. For example, if a storage area network interconnection (e.g. used by Storage Application Service Providers to sell data storage as a service rather than as an equipment purchase) were to be run under a FC-PH protocol it would experience failures and/or performance degradation when the server overrun's the input buffers of the FC access device (i.e. the interface between the server/FC link and the metro area link/storage device).

An existing means of avoiding such failure and degradation is to use a transparent Metro Area Network Link based upon optical repeaters with bandwidth equal to the rate of the fiber channel point-to-point link. However, this is an expensive solution because the cost of metro area bandwidth is high. Also, because such transparent links typically do not provide a local flow control mechanism, the FC-PH flow control mechanism (i.e. the R_RDY primitive) suffers from long propagation delay (referred to as "time of flight") as the primitives traverse the metro area and this causes a degradation of throughput.

There is a need, therefore, for effective means to control the flow of data from a fiber channel link to a metro area transport link without loss of frames or delay such that a network operator (e.g. service provider) is able to provide fiber channel services over lower bandwidth (and hence lower cost) metro area links. Further, there is a need for means to enable a network operator to set (or "tune") the parameters which control the flow of data at the entry to the metro area network so as to permit the operator to tailor the data flow to the particular needs of the application/service (and thereby allow the operator to make an application specific trade-off between latency and throughput).

SUMMARY OF THE INVENTION

In accordance with the present invention there is provided a data flow control method and apparatus for controlling the rate of transport of data units from a first data channel to a second data channel of lower bandwidth than the first channel. The release of each data unit by a data source for transport onto the first channel is governed by a credit-based protocol whereby one data unit is released upon the provision of one credit unit. A buffer of size N is located intermediate the first and second data channels for holding data units transported from the first channel. A first marker identifies a high limit H of the buffer at which a first condition occurs, H being less than N and the first condition applying when the number of data units in the buffer reaches H. A second marker identifies a low limit L of the buffer at which a second condition occurs, L being less than H and the second condition applying when the number of data units in the buffer reaches L. A credit unit owed counter O counts the number of credit units which become owed to the data source when the second condition applies. A third marker Max identifies a maximum number of credit units that may be provided to the data source when the first condition applies and the value of the credit unit counter is greater than zero. A controller, which is preferably a state machine, controls the markers and counter and the provision of credit units to the source according to the following algorithms. When the first condition applies and the O counter is zero one credit unit is provided to the data source upon the release of each data unit for transport onto the second channel. When the second condition applies the provision of credit units to the source is halted and the O counter is incremented upon the release of each data unit for transport onto the second channel. When the first condition applies and the O counter is greater than zero up to Max credit units are provided to the data source upon the release of each data unit for transport onto the second channel.

Preferably the values H, L and Max are user-selectable. The first data channel may be a fiber channel point-to-point serial link, the second data channel a SONET metropolitan area link, the credit unit a R_RDY primitive of the FC-PH protocol and the data units payload data frames. The data source may be a client device, such as a server, connected to the fiber channel link. In the preferred embodiment the buffer is a FIFO RAM.

BRIEF DESCRIPTION OF THE DRAWINGS

The invention will now be described in detail with reference to the following drawings in which like reference numerals refer to like elements throughout.

DETAILED DESCRIPTION OF THE ILLUSTRATED PREFERRED EMBODIMENT

Figure 1:
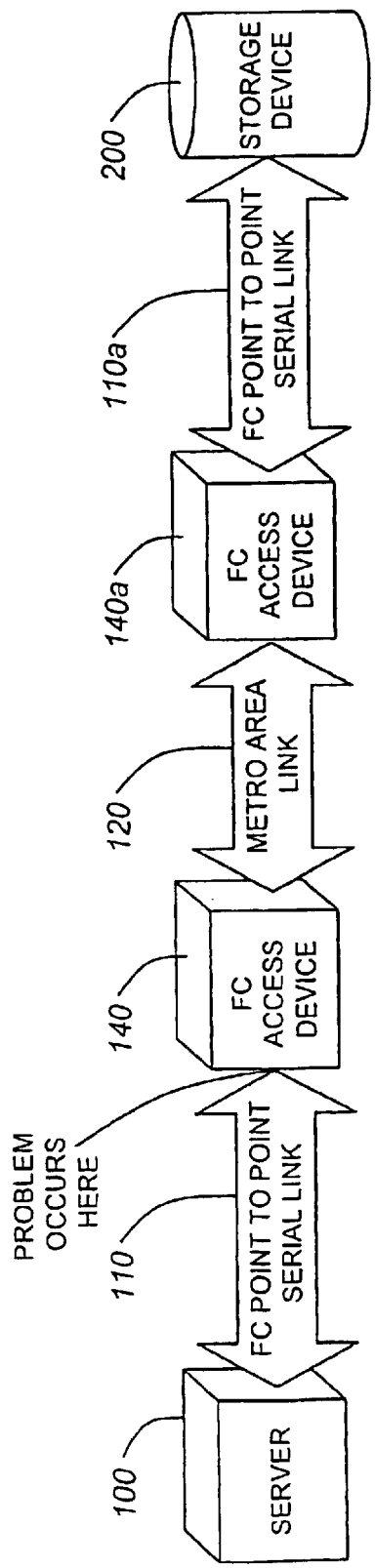
FIG. 1 is a schematic block diagram illustrating the point in the data transport system at which the problem addressed by the present invention occurs.

FIG. 1 of the drawings is a schematic block diagram illustrating the point in an exemplary data transport system at which the problem addressed by the present invention occurs. For this exemplary application a server 100 is a client device from which data is transported over a high bandwidth FC link 110 to an FC access interface device 140 which includes data flow control apparatus according to the invention (as described herein). The interface device 140 controls the flow of the data and outputs the data onto a metro area transport link 120 of lower bandwidth than the FC. At the remote end of the data transport system a similar interface device 140a receives data from the metro link 120 and outputs the data onto another higher bandwidth FC channel 110a for transport to a storage device 200 (being a remote device). The interface device 140a also includes a data flow control apparatus as described herein. The interface device 140a receives the storage device-generated data from the higher bandwidth FC channel 110a and controls the flow of that data and outputs the same onto the lower bandwidth metro area link 120.

Figure 2:
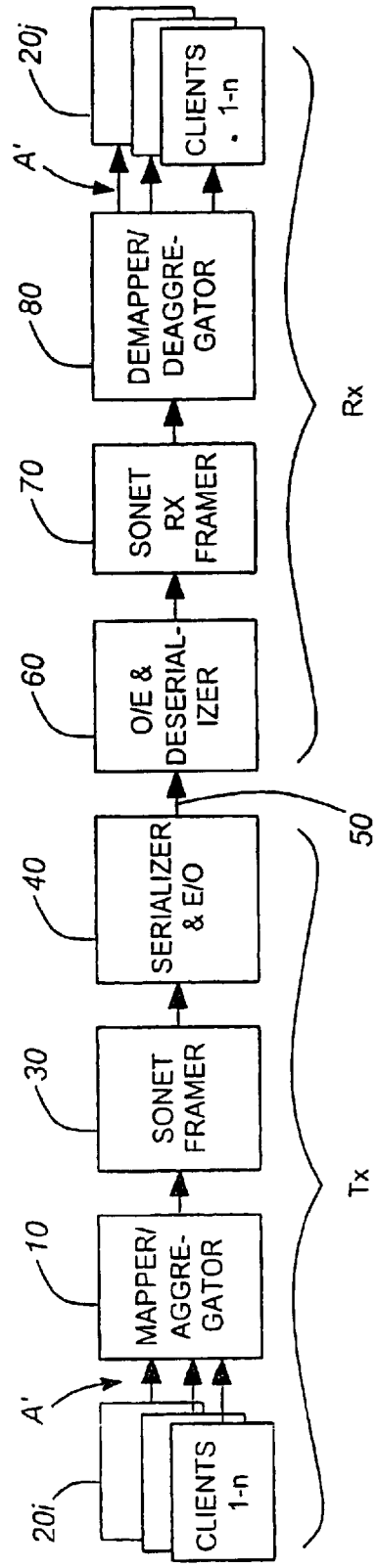
FIG. 2 is a broad functional block diagram of an end-to-end data network showing the client interface areas (A') of the network in which the present invention is utilized.

FIG. 2 is a broad functional block diagram of an end-to-end network showing the client (FC) interface areas of the network in which the data flow control apparatus of the present invention is utilized. The network components of transmit (Tx) and receive (Rx) nodes (i.e. a transmitter and receiver, resp.) of the network, servicing clients $20_{i,j}$, are shown. At the transmit node a mapper/aggregator 10 performs two related functions. First, it maps the client data into a SONET payload according to a mapping function which allocates STS-1's to a particular client $20_i$ based on a configuration provided to it. Since each STS-1 represents a fixed amount of bandwidth the number of STS-1's assigned to a client determines how much bandwidth is allocated to that client. The second function that is performed by the mapper/aggregator 10 is aggregation of the client STS-1's into a composite STS-48 payload. The aggregate data stream is then fed into a standard SONET transmit framer 30 to insert section/line/path overhead information (data) and create a proper SONET frame. The parallel output from the framer 30 is then serialized and converted to an optical signal by a serializer/E-O converter 40 for transmission over an optical fiber 50 of the metro area link 120. At the receive node the received optical signal is converted back to an electrical signal and to parallel format by an O-E/deserializer converter 60 and then fed into a SONET receive framer 70 where the section/line/path overhead data is extracted and processed. The resulting data stream is passed into a de-aggregator/de-mapper 80 which performs the inverse function of the mapper/aggregator 10. The de-aggregator section receives the composite STS-48 payload from the SONET framer and, based upon the local configuration memory, it then separates the composite STS stream into STS-1's according to the client $20_j$ they belong to. The de-mapper section then takes the STS-1's assigned to a particular client $20_j$ and extracts the client data from it.

Figure 3:
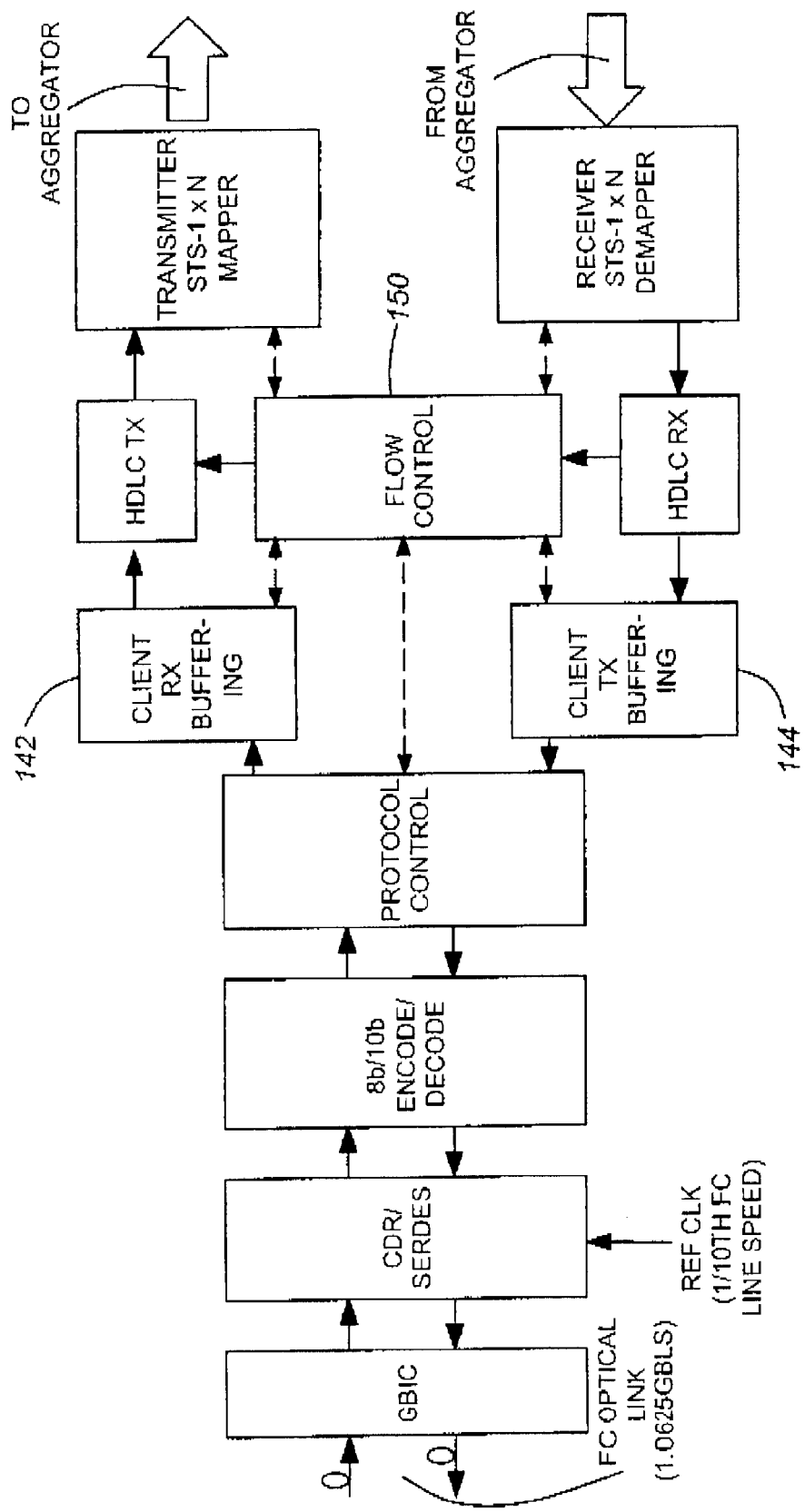
FIG. 3 is a broad functional block diagram of one client interface area of the network in which the present invention is utilized.
Figure 4:
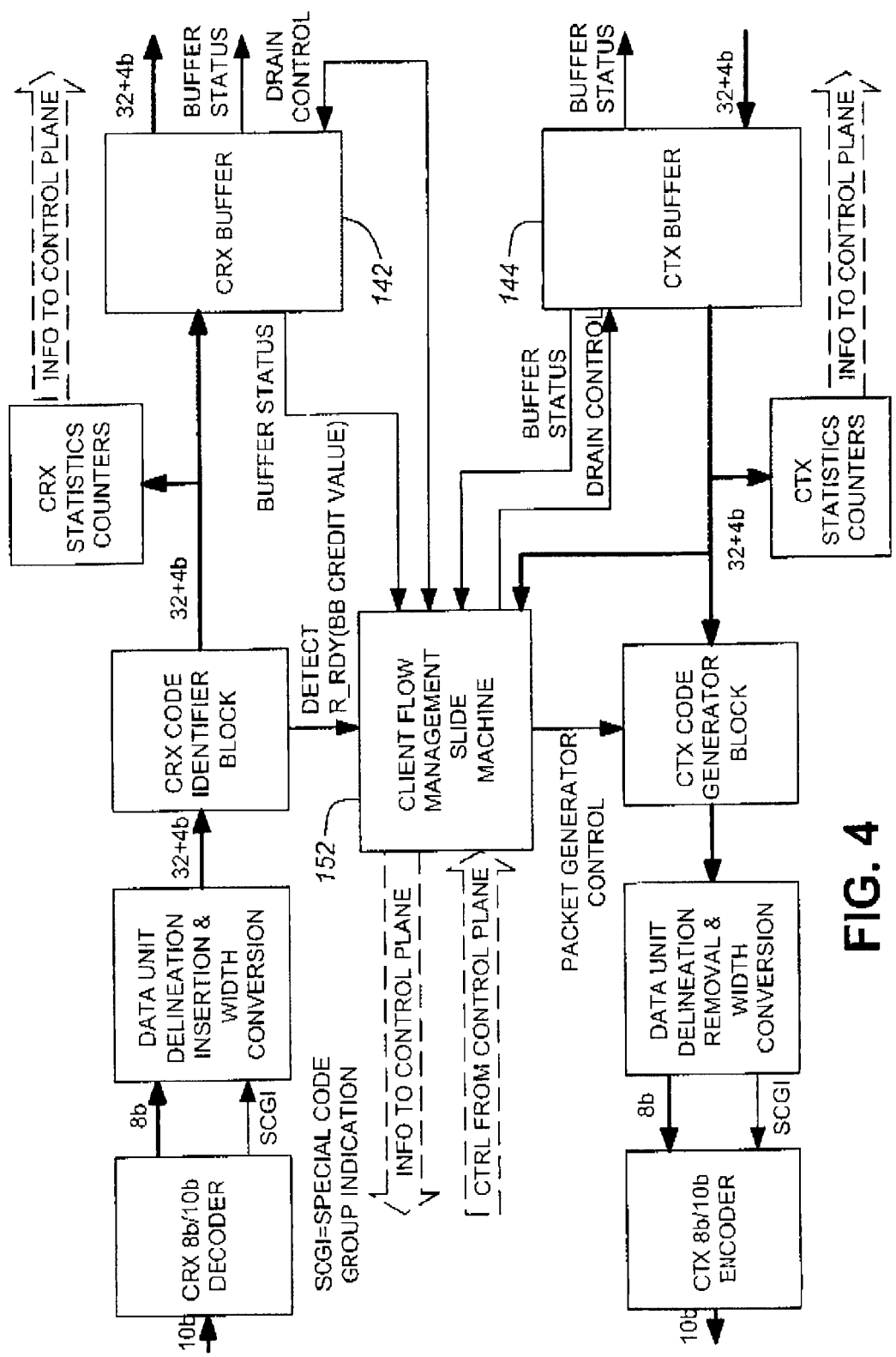
FIG. 4 is a functional block diagram of the components of a client interface device incorporating the data flow control apparatus of the present invention.

FIG. 3 is a broad functional block diagram of an FC interface 140 of the network in which the data flow control apparatus of the present invention is utilized in the flow control area 150. FIG. 4 is a more detailed functional block diagram of the interface showing a client flow management state machine 152 which operates as a controller in the data flow control apparatus and is configured to perform the decision making algorithms thereof (a hardware state machine being used for its high speed capability).

Figure 5:
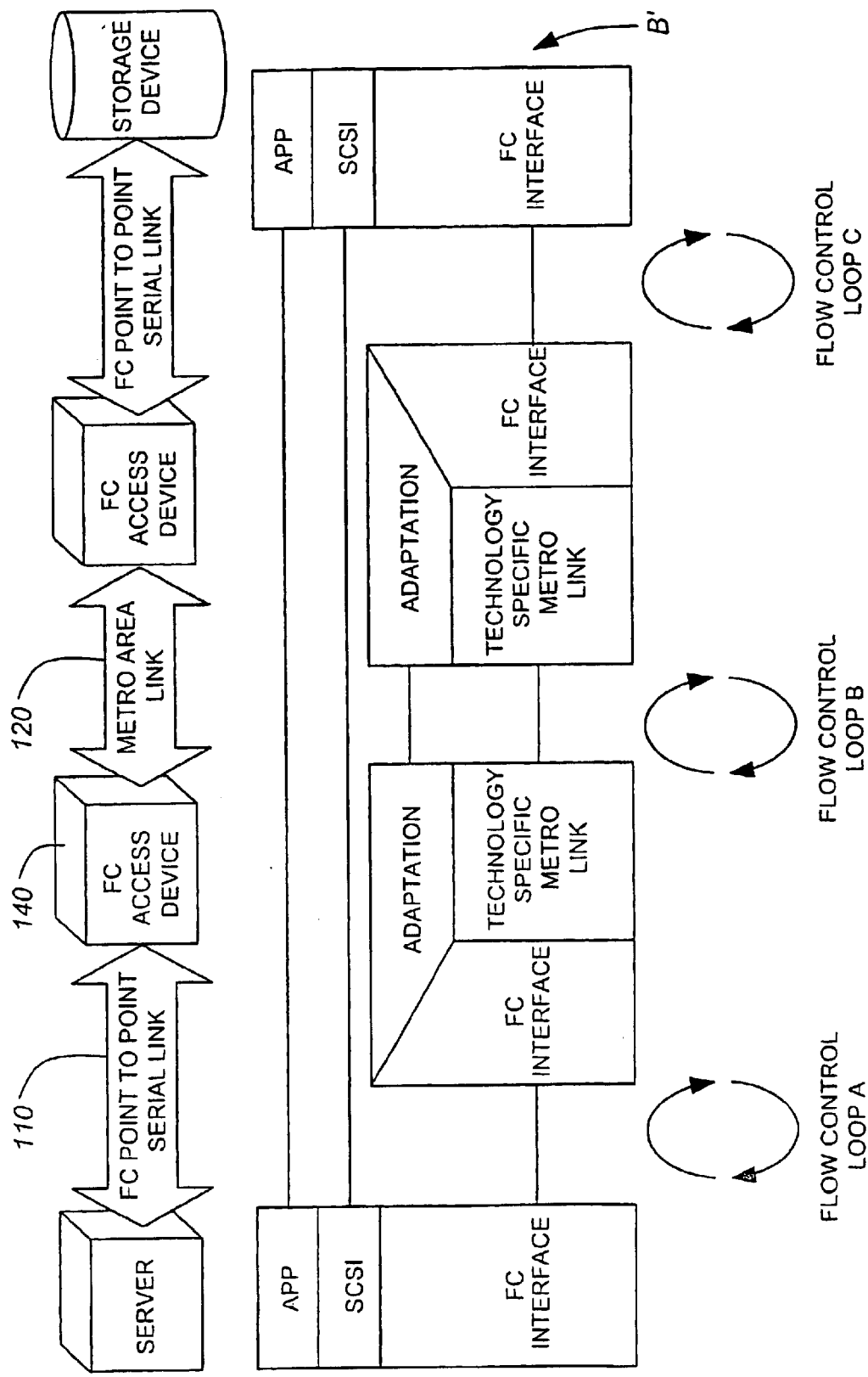
FIG. 5 is a schematic block diagram showing the data transport network as per FIG. 1 but including an illustration of the data rate adaptation performed by the present invention by means of flow control loops A and C.

FIG. 5 is a schematic block diagram showing the data transport network (as per FIG. 1) with the data rate adaptation and flow control performed by the control apparatus illustrated by the layer diagram (B') and also by flow control loops A and C (it is to be understood that the workings of flow control loop B pertain to different system elements not addressed by the present invention).

Figure 6:
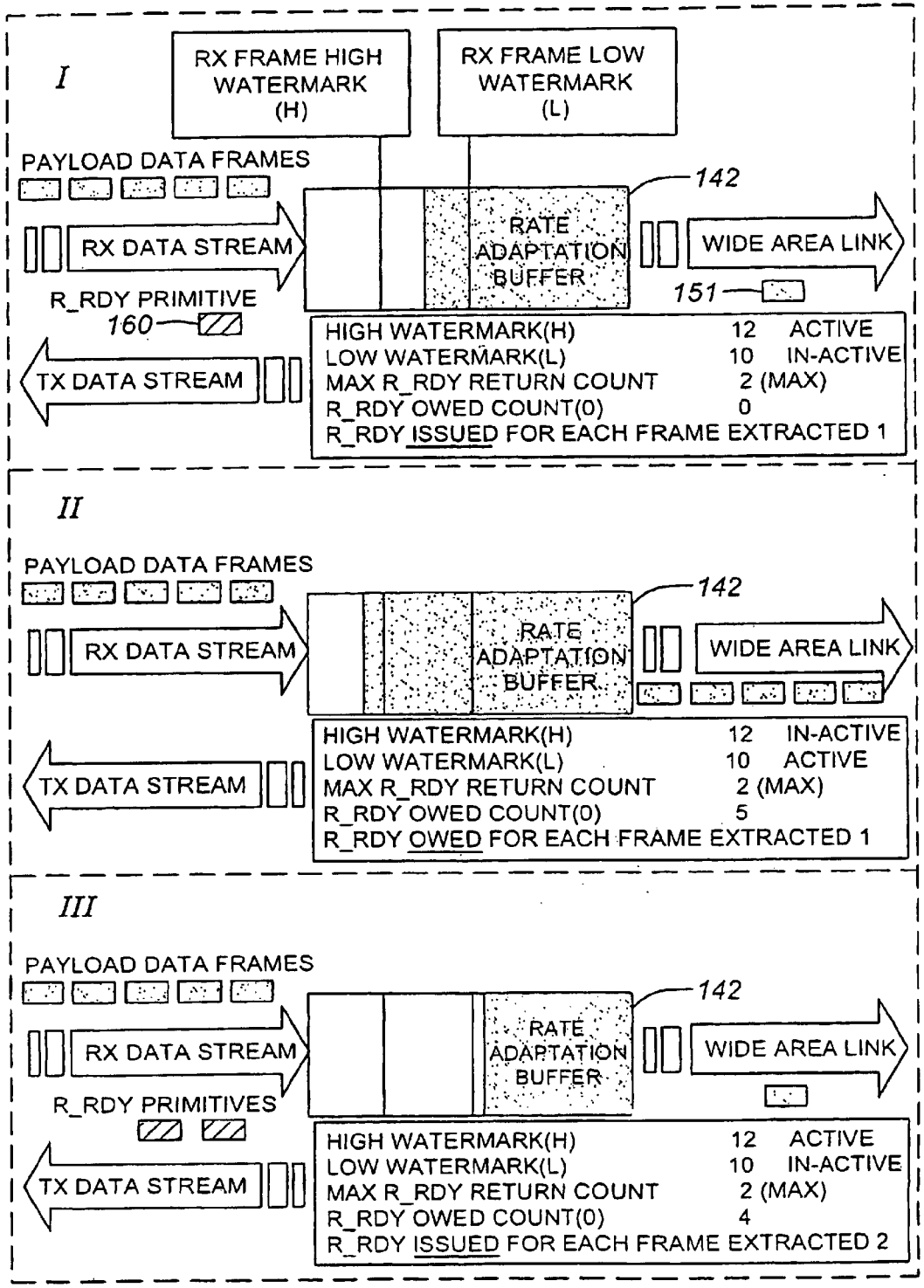
FIG. 6 is a schematic flow diagram illustrating the data flow control apparatus and method of the present invention.

FIG. 6 is a schematic flow diagram illustrating the steps performed by the data flow control apparatus of the present invention. By locally applying a control algorithm, based upon adjustable thresholds (referred to as markers), the control apparatus adapts FC data traffic to a lower bandwidth metro area link while using the native FC-PH buffer-to-buffer flow control credit unit mechanism (i.e. R_RDY primitives). Advantageously, this prevents any loss of data frames from occurring at the access point to the metro area. A rate adaptation buffer 142 is provided for use by the controller to de-couple the disparate data rates input and output from the FC interface 140 (i.e. between the FC link 100 and the metro area link 120), the objective being to prevent the client device 100 from overflowing the rate adaptation buffer 142. The function of the buffer 142 is to absorb bursted data frames from the client device and provide the means for rate adaptation between the FC and metro area links. As detailed in the following the control apparatus monitors and controls the amount of data stored in the rate adaptation buffer.

The rate adaptation buffer 142 can accommodate up to N frames received from the client device 100 and every frame is accepted and placed in the buffer 142. In the preferred embodiment a FIFO RAM buffer is used and N equals 243 (i.e. 243 full sized client FC frames). Under the control of the controller, R-RDY primitives are returned to the client device 100 based upon the current settings of three distinct control markers (variables), namely, a Rx Frame High Watermark (H), a Rx Frame Low Watermark (L) and an Rx Max R_RDY Return Count (Max). The control algorithm is illustrated by the series of flow diagrams I, II and III of FIG. 6 in which, for ease of instruction only, a value of 12 is assigned to H, 10 to L and 2 to Max. The value of each marker H, L and Max is user selectable and may be selected as desired by the network operator (i.e. the service provider who sets up the interface) to tune the network flow parameters to an appropriate configuration for a given application to be provided by the operator. The value selected for the highwater mark (H) should be at least one full fibre channel frame length (2 Kilobytes) below the limit of the buffer. The high and low watermarks (H, L) are both single shot frame count thresholds and only one of these is active at any given time.

In the control flow diagram of FIG. 6(I) the high watermark (H) is set to represents the active buffer limit because the buffer 142 does not yet contain H frames and this is illustrated by the shading of the buffer 142 which represents frames within the buffer. In this diagram (I) the number of frames shown to be in the buffer 142 is more than the low watermark (L) but has not yet reached the high watermark (H). The values of the markers H, L and Max pertaining to this diagram are such that for each frame 151 that is extracted from the buffer for transport over the metro (wide) area link a R_RDY primitive is returned to the client device (therefore, the flow at this stage follows the FC-PH protocol standard) and this returned R_RDY primitive enables the forwarding of additional frames by the client device.

When the high watermark (H) limit of the buffer 142 is reached the control algorithm changes and the flow control commands illustrated by FIG. 6(II) are applied whereby the high watermark (H) limit becomes inactive and the low watermark (L) limit becomes active. In this state the controller halts any further generation of R_RDY primitives and this means that the flow of data from the client device is halted either immediately (in the case where it has no unused R_RDY primitives) or within a fixed frame count time (in the case where it has unused R_RDY primitives and can use those to transmit a number of frames equalling the number of R_RDYs so held). During this time period that the lower limit marker L is activated and generation of R_RDYs is halted an additional counter, identified as the Rx R_RDY owed (O) counter, is activated and incremented once for each frame extracted from the rate adaptation buffer for transport to the metro link. This is illustrated in FIG. 6(II) in which the buffer is shown to have reached the high watermark (H) and the R_RDY owed (O) counter has been set to five following the extraction of five frame from the buffer during the time that the low watermark (L) is in an active state.

As frames are extracted from the rate adaptation buffer and the client device depletes its available R_RDYs (i.e. its remaining buffer-to-buffer credits) the rate adaptation buffer will eventually reach the lower limit of the buffer marked by the currently active low watermark (L) threshold. As illustrated in FIG. 6(III), when this state occurs the flow control apparatus deactivates the low watermark (L) and reactivates the high watermark (H) whereby the generation and transport of R_RDY primitives to the client device is resumed. This state is essentially the same as the initial state (per FIG. 6(I)) except that now the R_RDY owed (O) count is not zero and, instead, the O counter flags that there exists a specified number of R_RDYs which are owed to the client device. When in this state the control apparatus issues up to a Max number of R_RDYs to the client device for every frame extracted from the buffer for transport to the metro area link and, in turn, the O counter is decremented by that number of R_RDYs which are issued to the client device. The controller accounts for the possibility that less than Max R_RDYs are to be sent under any condition which, if Max R_RDYs were issued, would result in the O counter having to become negative (i.e. less than zero) since such a state of the O counter is not permitted. In the example illustrated by FIG. 6 (III) the selected value for Max was 2 and, therefore, in this state up to 2 R_RDYs are issued to the client device for each frame extracted (unlike the initial state of FIG. 6(I) in which a one-to-one transfer of R_RDYs was carried out). The state machine 152 applies this rule at all times, even at the initial start-up of the system data flow, but no action results at the initial start-up because the O counter at that time has not been incremented (i.e. is zero).

To ensure that only full data frames are passed on from the rate adaptation buffer 142 a frame counter is used. When a data frame has been sent to the buffer (i.e. a complete frame) the frame counter is incremented to indicate to the other (i.e. output) side of the buffer that a full frame is present in the buffer. When the other side removes a complete frame the frame counter is decremented. If the frame counter ever reaches a zero value the other side is not able to remove any data and this prevents anything but full data frames being transmitted. Similarly, on the reverse path (Ctx), the flow control apparatus only allows transmission of a data frame to the client device if the buffer 144 contains a full data frame. It determines this by monitoring the buffer status using another counter which is incremented each time a full frame is input to the buffer from the metro area link side of the buffer. When a frame is removed at the client side of the buffer this other counter is decremented. If this other counter ever reaches a value of zero no data can be taken from the client side of the buffer.

The flow control apparatus also controls a buffer-to-buffer credit (BB credit) counter to monitor the ability of the client device to accept data on the Ctx side of the interface (i.e. for transmitting data from the metro area link to the FC link). It tracks the number of frames that are currently in the rate adaptation buffer 144 plus the Rx R_RDY owed (O) count in order to monitor the number of R_RDY primitives which are outstanding at any given time. This number of outstanding R_RDY primitives represents the number of buffer-to-buffer credits currently consumed by the locally attached client device. The counter is set by the control plane to the value of BB credits that the client device has (i.e. the number of outstanding R_RDY primitives) and as the data frames are transmitted to the client device the BB credit counter is decremented. When an R_RDY primitive transmitted from the client device is detected the BB credit counter incremented. If the BB credit counter ever reaches a zero value, no data frames can be transmitted to the client device until R_RDYs are received from it.

It is to be noted that for the Client Tx (Ctx) direction of data flow there is no need to use the flow control apparatus of the invention because the FC-PH protocol standard is able to satisfactorily handle this flow of data which is from the lower bandwidth metro link to the higher bandwidth FC link.

The individual electronic and processing functions utilised in the foregoing described preferred embodiment are, individually, well understood by those skilled in the art. It is to be understood by the reader that a variety of other implementations may be devised by skilled persons for substitution. Persons skilled in the field of communication design will be readily able to apply the present invention to an appropriate implementation method for a given application.

Consequently, it is to be understood that the particular embodiment shown and described herein by way of illustration is not intended to limit the scope of the invention claimed by the inventors which is defined by the appended claims.

What is claimed is:

1. Data flow control apparatus for controlling the rate of transport of data units from a first data channel to a second data channel of lower bandwidth than said first channel, wherein the release of each said data unit by a data source for transport onto said first channel is governed by a credit-based protocol whereby one said data unit is released upon the provision of one credit unit, said apparatus comprising:
   (a) a buffer, intermediate said first and second data channels, of size N, for holding data units transported from said first channel;
   (b) a first marker for identifying a high limit H of said buffer at which a first condition occurs, wherein H is less than N and said first condition applies when the number of data units in said buffer is greater than H;
   (c) a second marker for identifying a low limit L of said buffer at which a second condition occurs, wherein L is less than H and said second condition applies when the number of data units in said buffer is less than L;
   (d) a counter O for counting the number of credit units owed, wherein said credit units become owed to said data source when said second condition applies;
   (e) a third marker Max for identifying a maximum number of credit units that may be provided to said data source when said second condition applies and the value of said credit unit counter is greater than zero; and,
   (f) a controller for controlling said markers and counter and the provision of credit units to said source, wherein prior to said first or second condition being triggered, one said credit unit is provided to said source upon the release of each said data unit for transport onto said second channel, upon said first condition applying no credit unit is provided to said source and said counter O is incremented once upon the release of each said data unit for transport onto said second channel, and, upon said second condition applying and said counter O being greater than zero up to Max, up to Max credit units are provided to said source upon the release of each said data unit for transport onto said second channel, and said counter O is decremented a corresponding amount.

2. Apparatus according to claim 1 wherein the values H, L and Max are user-selectable.

3. Apparatus according to claim 2 wherein said first data channel is a fiber channel point-to-point serial link and said second data channel is a SONET metropolitan area link.

4. Apparatus according to claim 3 wherein said data source is a client device connected to said fiber channel link.

5. Apparatus according to claim 4 wherein said credit unit is a R_RDY primitive of the FC-PH protocol.

6. Apparatus according to claim 5 wherein said controller comprises a state machine.

7. Apparatus according to claim 6 wherein said buffer is a FIFO RAM.

8. Apparatus according to claim 7 wherein said client device is a server.

9. Apparatus according to claim 3 wherein said data units are payload data frames.

10. A method for controlling the rate of transport of data units from a first data channel to a second data channel of lower bandwidth than said first channel, whereby each said data unit is provided from a data source for transport onto said first channel when a credit unit has been provided to said source, said method comprising the steps:

(a) inputting to a buffer of size N and located intermediate said first and second data channels data units transported from said first channel;

(b) identifying by a first marker a high limit H of said buffer at which a first condition occurs, whereby H is less than N and said first condition applies when the number of data units in said buffer is greater than H;

(c) identifying by a second marker a low limit L of said buffer at which a second condition occurs, wherein L is less than H and said second condition applies when the number of data units in said buffer is less than L;

(d) incrementing a credit unit owed counter O for each credit unit which becomes owed to said data source when said second condition applies;

(e) identifying by a third marker Max a maximum number of credit units that may be provided to said data source when said second condition applies and the value of said credit unit counter is greater than zero; and, (f) controlling said markers and counter and the provision of credit units to said source including: prior to said first or second condition being triggered, providing one said credit unit to said source upon the release of each said data unit for transport onto said second channel; when said first condition applies, halting the provision of credit units to said source and incrementing once said O counter upon the release of each said data unit for transport onto said second channel; and, when said second condition applies and said O counter is greater than zero up to Max, providing up to Max said credit units to said source upon the release of each said data unit for transport onto said second channel, and decrementing said counter O a corresponding amount and decrementing said counter O a corresponding amount.

11. The method of claim 10 whereby the values H, L and Max are selectable by the user.

12. The method of claim 11 whereby said first data channel is a fiber channel point-to-point serial link and said second data channel is a SONET metropolitan area link.

13. The method of claim 12 whereby said data source is a client device connected to said fiber channel link.

14. The method of claim 13 whereby said data units are payload data frames.

15. The method of claim 14 whereby said credit unit is a R_RDY primitive of the FC-PH protocol.

16. The method of claim 15 wherein said client device is a server.

* * * * *